(12) United States Patent
Mehrotra et al.

(10) Patent No.: US 7,940,302 B2
(45) Date of Patent: May 10, 2011

(54) APPARATUS AND METHOD FOR PRIVACY PROTECTION OF DATA COLLECTION IN PERVASIVE ENVIRONMENTS

(75) Inventors: Sharad Mehrotra, Irvine, CA (US);
Mohanned Alhazzazi, Irvine, CA (US);
Mahesh Datt, Irvine, CA (US); Nalini Venkatasubramanian, Irvine, CA (US);
Jehan Wickramasuriya, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 1638 days.

(21) Appl. No.: 11/227,721

(22) Filed: Sep. 14, 2005

(65) Prior Publication Data

US 2006/0064384 A1    Mar. 23, 2006

Related U.S. Application Data

(60) Provisional application No. 60/610,477, filed on Sep. 15, 2004.

(51) Int. Cl.
*H04N 7/18* (2006.01)
(52) U.S. Cl. .................................................. 348/156
(58) Field of Classification Search .............. 348/143, 348/156
See application file for complete search history.

(56) References Cited

U.S. PATENT DOCUMENTS

| 2003/0110131 A1* | 6/2003 | Alain et al. .............. 705/51 |
| 2003/0197612 A1* | 10/2003 | Tanaka et al. .......... 340/572.1 |
| 2004/0105006 A1* | 6/2004 | Lazo et al. ............... 348/169 |

FOREIGN PATENT DOCUMENTS

JP          2000000216 A    *    1/2000

* cited by examiner

*Primary Examiner* — Marsha D Banks Harold
*Assistant Examiner* — Jeremaiah C Hallenbeck-Huber
(74) *Attorney, Agent, or Firm* — Daniel L. Dawes; Marcus C. Dawes

(57) ABSTRACT

A security system which is nonintrusive of personal privacy of a person in a space comprises at least a first localization sensor subsystem, if any, in the possession of the person; a video surveillance subsystem arranged and configured to collect visual data related to the person in the space; and a computer subsystem coupled to the localization sensor subsystem and video surveillance subsystem to associate a predetermined privacy level with the localization sensor subsystem, and to provide an access control privilege with the localization sensor subsystem, the computer subsystem determining how to present, store and/or retrieve the visual data while meeting predetermined the privacy level associated with the person.

23 Claims, 10 Drawing Sheets

Fig. 4a
Fig. 4b
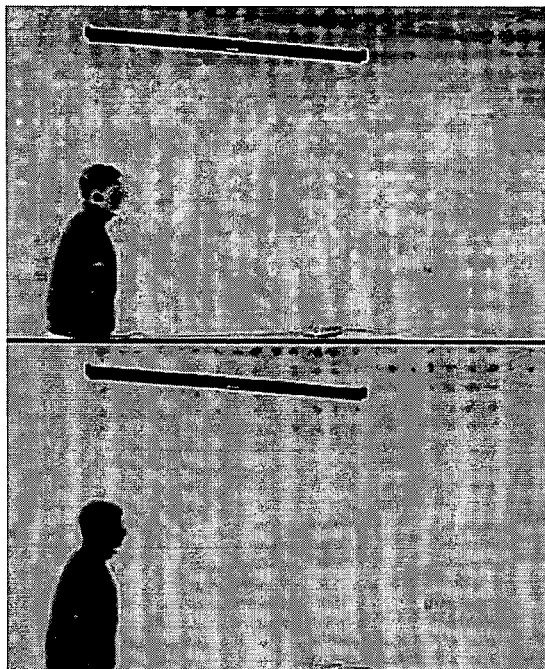
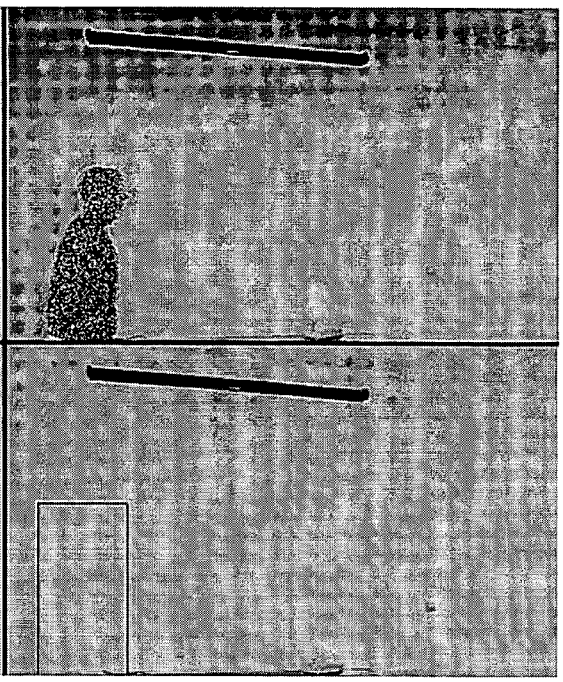
Fig. 4c
Fig. 4d

Fig. 6a                              Fig. 6b

APPARATUS AND METHOD FOR PRIVACY PROTECTION OF DATA COLLECTION IN PERVASIVE ENVIRONMENTS

RELATED APPLICATIONS

The present application is related to U.S. Provisional Patent Application Ser. No. 60/610,477, filed on Sep. 15, 2004, which is incorporated herein by reference and to which priority is claimed pursuant to 35 USC 119.

BACKGROUND OF THE INVENTION

1. Field of the Invention

The invention relates to the field of video surveillance systems.

2. Description of the Prior Art

Around the world as the awareness of both crime and technology become more prevalent, officials find themselves relying more and more on video surveillance as a cure-all in the name of public safety. Used properly, video cameras help expose wrongdoing, but typically come at the cost of privacy to those not involved in any maleficent activity.

With the heightened consciousness among the public, private and government organizations for security, surveillance technologies, especially video surveillance, have received a lot of public attention. Video surveillance systems are being considered or deployed in a variety of public spaces such as metro stations, airports, shipping docks, etc. As cameras are installed in more places, so do legitimate concerns about invasion of privacy. Privacy advocates worry whether the potential abuses of video surveillance might ultimately outweigh its benefits.

Recently, there has been a increased interest in RFID-related research, both in the academic and commercial sectors. Particularly, solutions examining the threat to consumer privacy of RFID technology have proposed techniques to protect unwanted scanning of RFID tags attached to items consumers may be carrying or wearing. For example, some researchers propose the use of 'selecting blocking' by 'blocker tags' to protect consumer privacy threatened by the pervasive use of RFID tags on consumer products. This enables consumers to 'hide' or 'reveal' certain RFID tags from scanning when they want to.

Therefore, this type of art addresses security concerns relating only to the RFID hardware itself. Privacy concerns in video surveillance have not really been addressed in video processing research. Furthermore, these techniques require efficient implementations to process real-time video streams (usually MPEG-1 or MPEG-2). Variations of background subtraction has been used as a technique for foreground/background segmentation for long video sequences. As a relatively simple method, it works fairly well in most cases but its performance depends heavily on the accuracy of the background estimation algorithms.

A quasi-automatic video surveillance approach has been proposed by Marchesotti, L. et. al., "A Video Surveillance Architecture for Alarm Generation and Video Sequences Retrieval" in ICIP2002 (2002) based on event triggers to generate alarms and overcome the drawbacks of traditional systems.

An approach known as experimental sampling was proposed in Wang, J. et. al., "Experiential Sampling for video surveillance in the First ACM SIGMM international workshop on Video surveillance (2003), ACM Press, pp. 77-86, which carries out analysis on the environment and selects data of interest while discarding the irrelevant data.

The area of work dealing with privacy preservation in media spaces is relatively new, and a lot of the related work is in the domain of computer-supported corporative work (CSCW) Dourish, P et. al. "Awareness and Coordination in Shared Workspaces" in CSCW'92, Toronto (1992), ACM Press, New York, N.Y., pp. 107-114. and Zhao, Q. et. al., "Evaluating Image Filtering Based Techniques in Media Space Applications" in CSCW'98, Seattle) (1998), ACM Press, New York, N.Y., pp. 11-18. Of particular interest is the work presented by Boyle, M. et. al., "The Effects of Filtered Video on Awareness and Privacy" in Proc. of CSCW'00 (2000), pp. 1-10, which utilized blur and pixelization filters to mask sensitive details in video while still providing a low-fidelity overview useful for awareness. Specifically they analyze how blur and pixelize video filters impact both awareness and privacy in a media space. However, the limitation of these techniques are that the filters are not applied to the individual objects in the video but to the entire video frame, which makes enforcing separate policies and distinguishing between authorized and unauthorized personnel impossible.

Previous work utilizing eigenspace filters in Crowley, J. et. al. "Things That See" in Communications of the ACM, 43: 3 (March) (2000), ACM Press, New York, N.Y., pp. 54-64, proposed a way to mask out potentially sensitive action associated with an individual by using a set of pre-defined base images to extract a representation of the person (face) by taking an inner product of the video images with those base images stored in a database. This technique though useful, relies on capturing and storing base images of the potential subjects, which may be both infeasible as well as against the notion of trying to store as little identifiable information about individuals in the space as possible. There has been a large body of work on policy specification and access control in XML Bertino, E. et. al., "Controlled Access and Dissemination of XML Documents" in WIDM'99 ACM (1999) and Damiani, E., and di Vimercati et. al, "A Fine-Grained Access Control System for XML Documents" in ACM Transactions on Information and System Security (TISSEC) (2002), vol. 5, num 2, pp. 169-200. The majority provide run-time checking of access control policies and fine-grained specification of policy.

IBM Smart Video Surveillance Project is a project which focuses on privacy protection in physical spaces. However, the architecture of the invention is more general in that video is simply one example of a sensor that can be used to collect data within pervasive spaces. Additionally, we have specified a policy language for expressing access control constraints and providing group-based (inventory-person combinations) security, while in the IBM project each access policy is based on the identity of the user. Hence the system needs to identify a user to enforce the policy which seems to violate the privacy of the users.

Additionally, it is not clear how localization may be achieved in this system. Solutions like face recognition are proposed but this also suffers from the fact that identification of the users is necessary at some level. Our system abstracts the identity of the users from the access control policies and utilizes additional sensors for localization, all of which can be achieved in a manner in which privacy is protected.

Current data collection technologies usually neglect issues of privacy in carrying out their respective functions. An example of this is modern video surveillance, which we see in our daily lives and is usually accepted as being intrusive with no provisions for the preservation of privacy of the monitored subjects.

What is needed is a framework for privacy-protecting data collection in media spaces.

What is needed is some kind of intelligent surveillance system that is more selective in what video is captured, and which focuses on anomalous events while protecting the privacy of authorized personnel.

BRIEF SUMMARY OF THE INVENTION

The illustrated embodiment of the invention combines sensor technology with traditional video surveillance in providing a privacy protecting framework that exploits the strengths of these modalities and complements their individual limitations. This is achieved by fusing multi-sensor data with an access control policy framework to evaluate and enforce these policies in physical spaces and doing so in a privacy-protecting manner.

The fully functional system utilizes off the shelf sensor hardware (i.e. RFID, motion detection) for localization, and combines this with an XML-based policy framework for access control to determine violations within the space. This information is fused with video surveillance streams in order to make decisions about how to display the individuals being monitored. To achieve this, we have implemented several video masking techniques that correspond to varying user privacy levels. These results are achievable in real-time at acceptable frame rates, while meeting the requirements for privacy preservation.

Sensor information is used for localization and is attached to set of policies so each individual can be given a privacy level and access control privileges which may be determined by administration, and which can mirror the hierarchical roles in an organization. Decisions are then made on how to present, store and/or retrieve individual information based on the data being collected by the sensors while meeting the individuals' privacy requirements. This allows us to present users in a privacy-preserving manner (e.g. mask their identity in the video stream originating from a space or obfuscate data originating from a sensor). The goal of such a framework is to push as much of the transformation of the data (i.e. the video processing) to the actual sensors themselves such that no compromising information would ever be collected if access control policies are met.

Thus, it can be understood that the invention overcomes the limitations of traditional video surveillance by combining input from multiple sources (sensors) while providing privacy to subjects that aren't "doing anything wrong". Ability to administer access control policies via sensor information (e.g. RFID) and use this information to determine privacy constraints (e.g. in the context of video surveillance).

The invention therefore has utility in the expression and enforcement of spatial-temporal access control policies. It is a tool for gathering sociological data for research in a privacy protecting manner. It is a tool for learning workplace interactions and people pattern of activity and/or trajectories. For example, learning consumers, behaviors and pattern of activity in shopping malls. Also, utility of resources for collaborative patterns. These patterns of activities and trajectories can aid in designing future buildings or spaces that can enhance security and emergency response, in a privacy protecting manner. The invention is an aid to law enforcement in public places by adding virtual officers "privacy persevering surveillance cameras" on the street that alert nearby officer when needed. This will reduce traffic violations and crimes, and result in faster response to crimes and tragic events in a privacy protecting manner while automating a lot of tasks that require manpower to investigate. The invention provides privacy protecting automated video surveillance for security and safety in outdoor and indoor places such as shopping malls, retail stores, hospitals, corporate buildings, airports, high security governmental structures.

More particularly, the illustrated embodiment is characterized as a security system which is nonintrusive of personal privacy of a person in a space comprising at least a first localization sensor subsystem, if any, in the possession of the person; a video surveillance subsystem arranged and configured to collect visual data related to the person in the space; and a computer subsystem coupled to the localization sensor subsystem and video surveillance subsystem to associate a predetermined privacy level with the localization sensor subsystem, and to provide an access control privilege with the localization sensor subsystem, the computer subsystem determining how to present, store and/or retrieve the visual data while meeting predetermined the privacy level associated with the person.

The computer subsystem monitors the person only when unauthorized access is made to the space. In one embodiment the localization sensor subsystem comprises an RFID tag, RFID tag reader, and a motion detector. In another embodiment the motion detector is substituted with an acoustic detector.

The computer subsystem masks the visual data according to the privacy level. The computer subsystem masks the visual data by selectively providing a degree of information loss from the visual data according to the privacy level.

In another embodiment the computer subsystem provides access control privilege according to association within a space of two or more specifically identified persons.

In yet another embodiment the security system further comprises a second localization sensor subsystem corresponding to an object, and the computer subsystem provides access control privilege according to association within a space of a specifically identified person with the object.

The computer subsystem comprises a sensing module which receives information from the localization sensor subsystem, and which sensing module receives video data from the video surveillance subsystem. A data management module is communicated with the sensing module to provide access control. The data management module comprises a policy engine to generate access control decisions and a database subsystem communicated to the policy engine to provide parameters form which the policy engine generates access control decisions. The policy engine comprises a policy decision point submodule and a policy enforcement point submodule communicated with each other through a request/response protocol. The policy decision point submodule receives authorization requests from the localization sensor subsystem and generates authorization decisions to the video surveillance subsystem. The database subsystem comprises a profile access database and a policy database. The policy enforcement point submodule is communicated to the profile access database to read attributes therefrom and is communicated to the policy database to read policy rules therefrom. The request/response protocol through which the policy decision point submodule and policy enforcement point submodule communicate is XACML. An auxiliary services module is communicated with the data management module for processing incoming video data. The auxiliary services module comprises obfuscation, motion detection and object tracking submodules. An output module is communicated with the auxiliary services module for customized reporting, logging or video rendering.

The security system further comprises a field generator for receiving signals from the RFID tag and relaying the received signals to the RFID reader.

In one embodiment the localization sensor subsystem comprises a motion detector coupled with and triggered by the field generator to read a corresponding space for an RFID tag when motion is detected by the motion detector, and if unauthorized entry into the space is determined by the computer subsystem, the video surveillance subsystem is activated to generate a processed video record according a predetermined privacy level associated with the read RFID tag, if any.

In the illustrated embodiment the video surveillance subsystem comprises a camera for providing a video pixel stream, a foreground module communicated to the camera for providing foreground pixel detection of the space, a background module for providing a background model communicated to the foreground module, a blob module communicated to the foreground module for clustering pixels into connected image domains, an object tracking module communicated to the blob module for localizing the person in a video frame correlated to localization parameters associated with the person moving in the space, a image processing module communicated to the object tracking module for modifying video data correlated to the object according to the selectively determined privacy level, and a video rendering module communicated to the image processing module for rendering a display of the modified video data correlated to the person. The camera is triggered by motion detection of the object in the space as generated by the localization sensor subsystem.

In the illustrated embodiment the image processing module comprises a pass through channel, a noise/blur filter, a pixel-coloring filter, and a bounding-box imager, one of which is activated according to the privacy level.

In the illustrated embodiment the policy engine processes a rule set comprised of a plurality 5-tuples of the form <r, p, oa, ts, res>, where r designates a space, p designates a privacy level, oa designates an object in an object association list, ts designates a temporal constraint corresponding to the validity of the rule, and res designates a result corresponding to 'allow' or 'deny' respectively.

The invention also includes a method of operation of any of the security systems described above.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

BRIEF DESCRIPTION OF THE DRAWINGS

FIGS. 4a-4d are photographs which illustrate the privacy-protecting masking techniques for video utilized by the illustrated embodiment.

Figure 1:
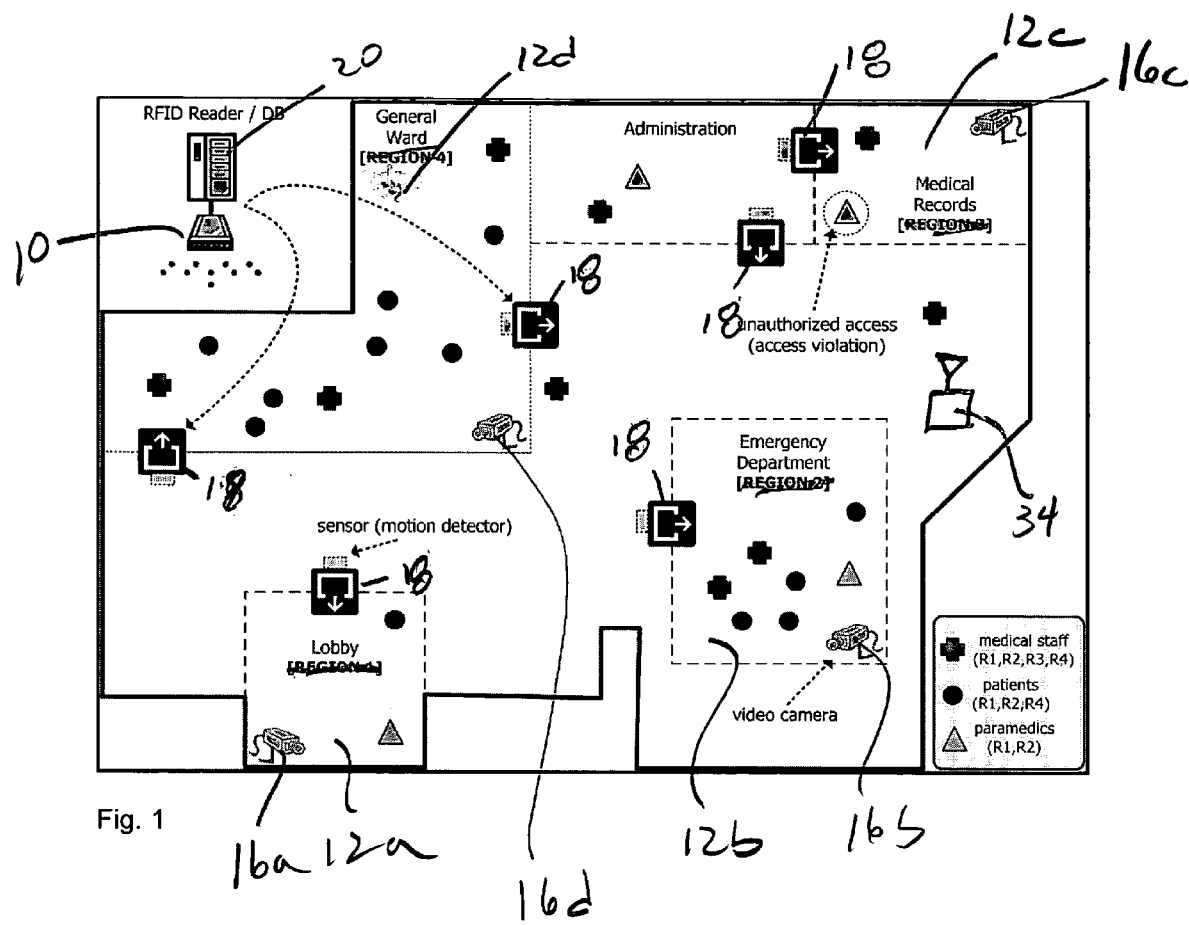
FIG. 1 is a diagram which illustrates the instrumentation of an hospital's physical space for a privacy protecting video surveillance according to the invention.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

The problem is to provide surveillance systems 10 that serve the security needs while at the same time protect the privacy of the individuals. The illustrated embodiment is a privacy preserving video surveillance system 10 that monitors subjects in an instrumented space 12 only when they are involved in an access violation, e.g. unauthorized entry to a space. In the illustrated embodiment, access control policies specify the access rights of individuals to different spaces of the monitored space 12. Policy violations, which are detected via use of conventional localization sensors 14, such as RFID tags and motion detection, are used to trigger the video surveillance system 10. Video manipulation techniques such as masking are used to preserve the privacy of authorized subjects when the surveillance system 10 is turned on.

Radio-frequency identification tag (RFID) 14, which is a tiny, relatively inexpensive device capable of transmitting a piece of static information across a distance. RFID tags 14 are currently in use for mediating access to various spaces 12, however they do not provide enough information to pinpoint the object being tracked within that space 12.

The illustrated embodiment fuses information from various sensors 14 with video information in implementing a privacy-protecting surveillance framework for media spaces 12. FIG. 1 is a diagram which illustrates the instrumentation of a hospital's physical space 12 for a privacy protecting video surveillance according to the invention. In the illustration of FIG. 1 we demonstrate the basic functionality of our proposed framework by means of an example that examines security in a hospital setting. The setting could be any space imaginable and clearly a hospital setting is described only for ease of one concrete visualization.

Assume the hospital is divided into federated spaces 12a, 12b, 12c . . . which are each covered by corresponding video cameras 16a, 16b, 16c . . . . Again, for the sake of simplicity one camera 16a, 16b, 16c . . . is provided for each corresponding space 12a, 12b, 12c . . . but the arrangement is arbitrary. More than one camera can be provided for each space 12a, 12b, 12c . . . or there may be panning cameras 16a, 16b, 16c . . . which each monitor multiple spaces 12a, 12b,

12c . . . . The RFID sensor information is used in conjunction with the video surveillance subsystem 10 to provide coverage of the monitored spaces 12a, 12b, 12c . . . . Furthermore, access control policies are defined for personnel carrying RFID tags 14. The enforcement of these policies is used to control the video surveillance system.

In the simplified illustration of FIG. 1 shows a scenario where the hospital consists of four spaces 12a, 12b, 12c and 12d, each monitored by a single one of the cameras 16a, 16b, 16c and 16d respectively. The idea is that if a subject is authorized to be in a particular space 12a, 12b, 12c or 12d which is determined by their RFID tag 14, that subject may be hidden in the video. In this way, the subject's privacy is maintained until he or she violates their given rights, e.g. by entering a different space 12a, 12b, 12c or 12d where they are not authorized to be.

In FIG. 1 each space 12a, 12b, 12c and 12d is monitored by a video feed from a corresponding camera 16a, 16b, 16c and 16d, which is triggered by a computer system 10 that processes the information from RFID readers 14 and their corresponding predefined access policies. A paramedic entering space 12c for example causes the motion sensor 18 to initiate a read on his/her tag 14 which is forwarded to the RFID reader 20. This causes an access violation and subsequently triggers the video feed for space 12c. However, the video image of medical personnel present in space 12c, who are authorized for all spaces 12a, 12b, 12c and 12d will be masked in the feed according to their given privacy level. Additional constraints can also be enforced such as restricting certain patient and doctor pairs or associating a bed or piece of equipment, which can also be tagged with RFID 14, with a particular patient.

Thus, it can be readily understood that the illustrated embodiment combines localization sensors 14 in particular RFID technology with traditional video surveillance to build a framework for privacy-protected data collection in media or monitored spaces 12a, 12b, 12c and 12d. System 10 is comprised of (1) localization components that utilize off-the-shelf sensor hardware (i. e RFID, motion detection) to determine location of subjects; (2) a policy framework that supports an access control specification using XML; (3) a video processing module that implements several video processing techniques for motion detection and object masking that can be applied in real time at interactive frame rates. The above components are integrated to realize a fully implemented video surveillance system 10 that autonomously detects anomalous events while protecting the privacy of authorized personnel who may appear in these video streams.

Figure 2:
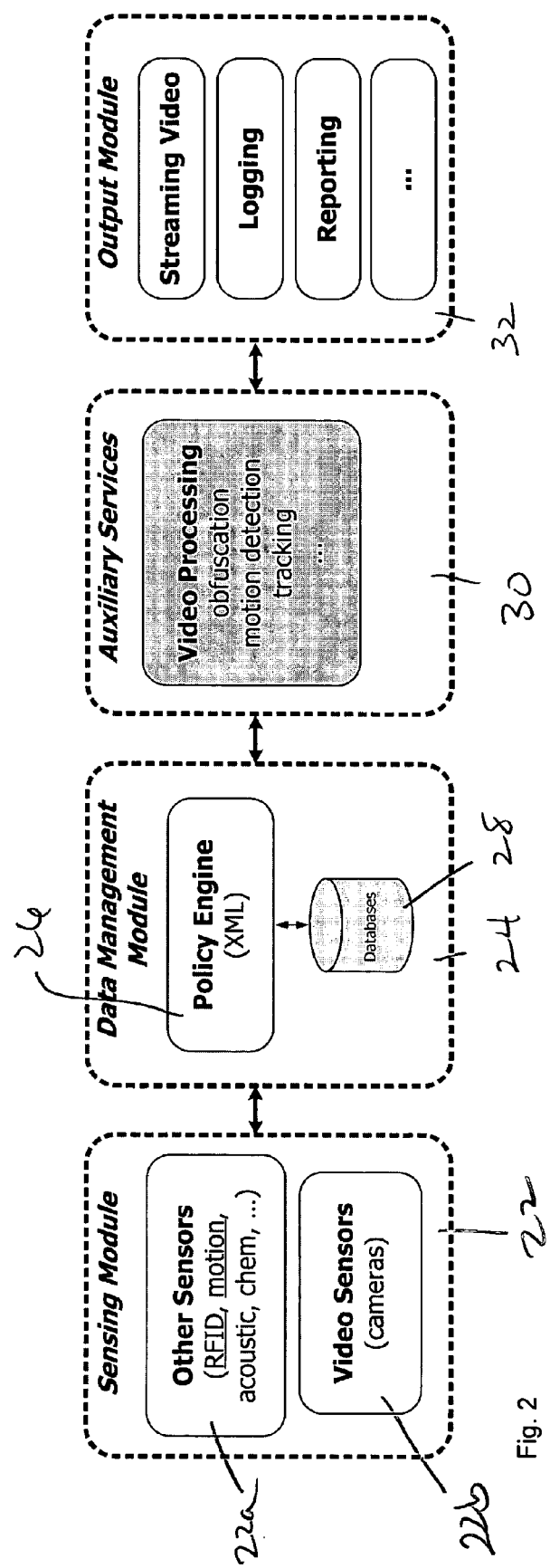
FIG. 2 is a high-level diagram of the system architecture of the invention.

Consider now the system architecture as diagrammed in FIG. 2 which depicts a high-level outline of the system architecture. The infrastructure comprises of the following components: Sensing module 22 processes data from incoming sensors 14. More specifically, a RFID control component 22a within sensing module 22 deals with RF-related messaging arriving at the reader(s) 20 in FIG. 1. Data from motion detection sensors 18 are also processed in sensing module 22. A video input component 22b handles the incoming video stream data from the various surveillance cameras 16.

Figure 5:
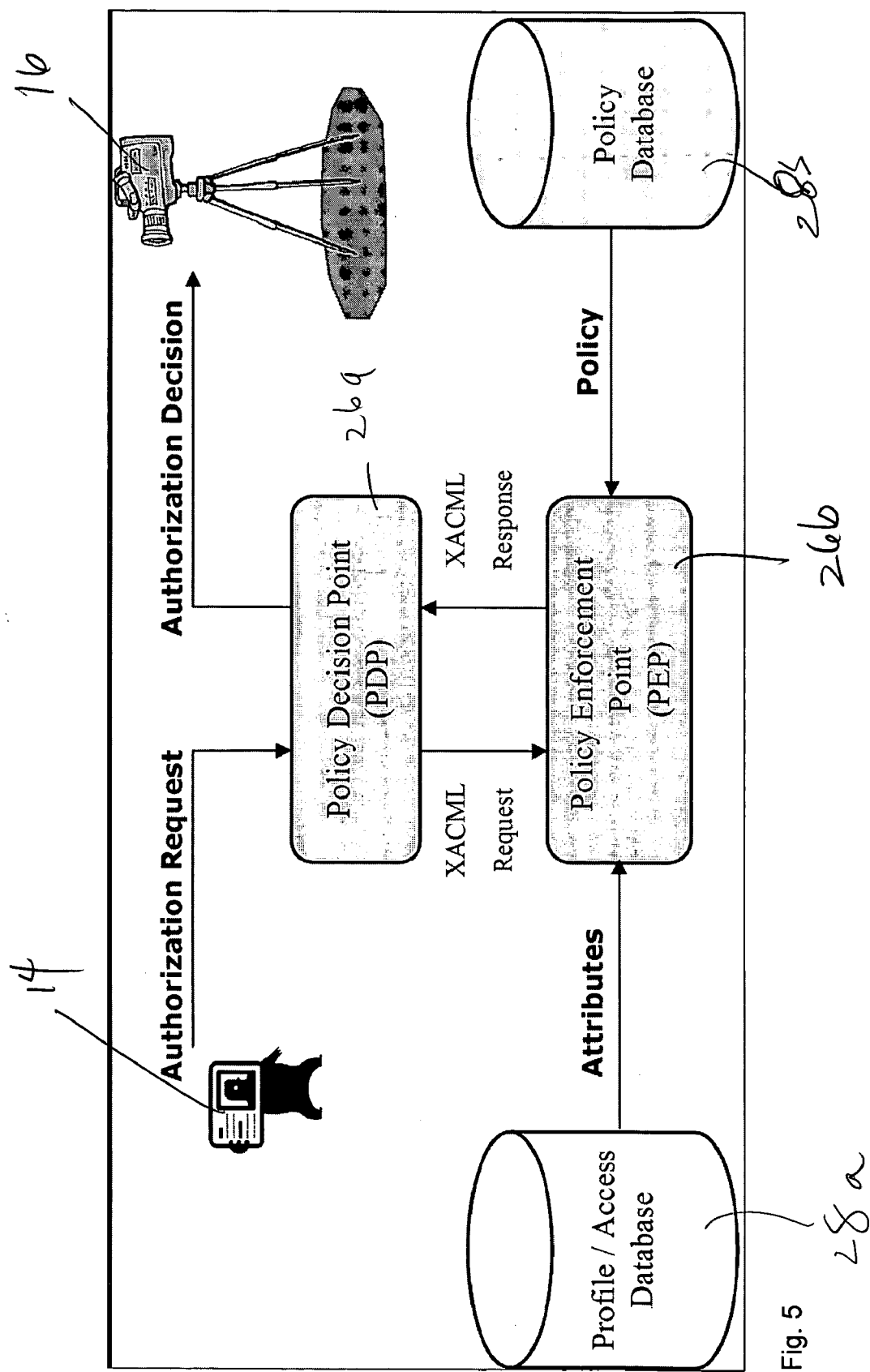
FIG. 5 is a diagrammatic depiction of the XACML-based policy framework.

Data management module 24 is comprised of a XML-based policy engine 26 for access control. This policy engine 26 interacts with a database subsystem 28 which is comprised of profile subdatabase 28a and policy subdatabase 28b for the users as diagrammatically depicted in FIG. 5. Policy engine 26 includes a policy decision point module 26a, which is communicated through XACML requests and responses to a policy enforcement point module 26b.

Auxiliary services module 30 provides a service library which includes submodules that provide auxiliary services on the sensed information including the incoming video stream(s). These auxiliary services include obfuscation, motion detection and object tracking submodules. For example masking may be applied to the video stream before it is passed to the output module 32, if the subject has been authorized by the policy engine 26.

Output module 32 handles customized reporting, logging and video rendering functionality. In particular, we utilize RFID sensor information together with motion detection sensors for localization of objects within the media space 12.

Consider now the radio frequency identification (RFID) technology used in combination with the illustrated embodiment of the invention. RFID technology provides the ability to interrogate data content without contact and the necessity of the line-of-sight communication. RFID is a means of storing and retrieving data by means of electromagnetic transmission to a RF compatible integrated circuit carried by the subject. A typical RFID system is comprised of a tag 14 (or a set of tags), a reader/receiver 20 that can read and/or write data to these tags 14, and optionally a field generator 34 depicted in FIG. 1 for relaying information from a space 12. The communication occurs at a predefined radio frequency and utilizes a protocol to read and receive data from the tags 14 via inductive coupling.

System 10 is instrumented as follows. Each protected space 12 is equipped with a field generator 34. The boundaries between adjacent spaces can either be physical, as in a door or wall separating two rooms, or virtual, as in a non-physical partition used to separate parts of a large room. Since we are interested in entry and/or exit to a space, each field generator 34 is equipped with a motion detector 18 which triggers a read of the space 12 when motion is detected. If there is no tag information associated with the motion, the signal sent to the reader 20 is categorized as unauthorized and video surveillance of the space 12 is triggered. Tags 14 are distributed to personnel, and a database 28 stores the access rights associated with each tag 14, and desired user privacy levels which are subsequently mapped to video masking techniques.

Figure 3:
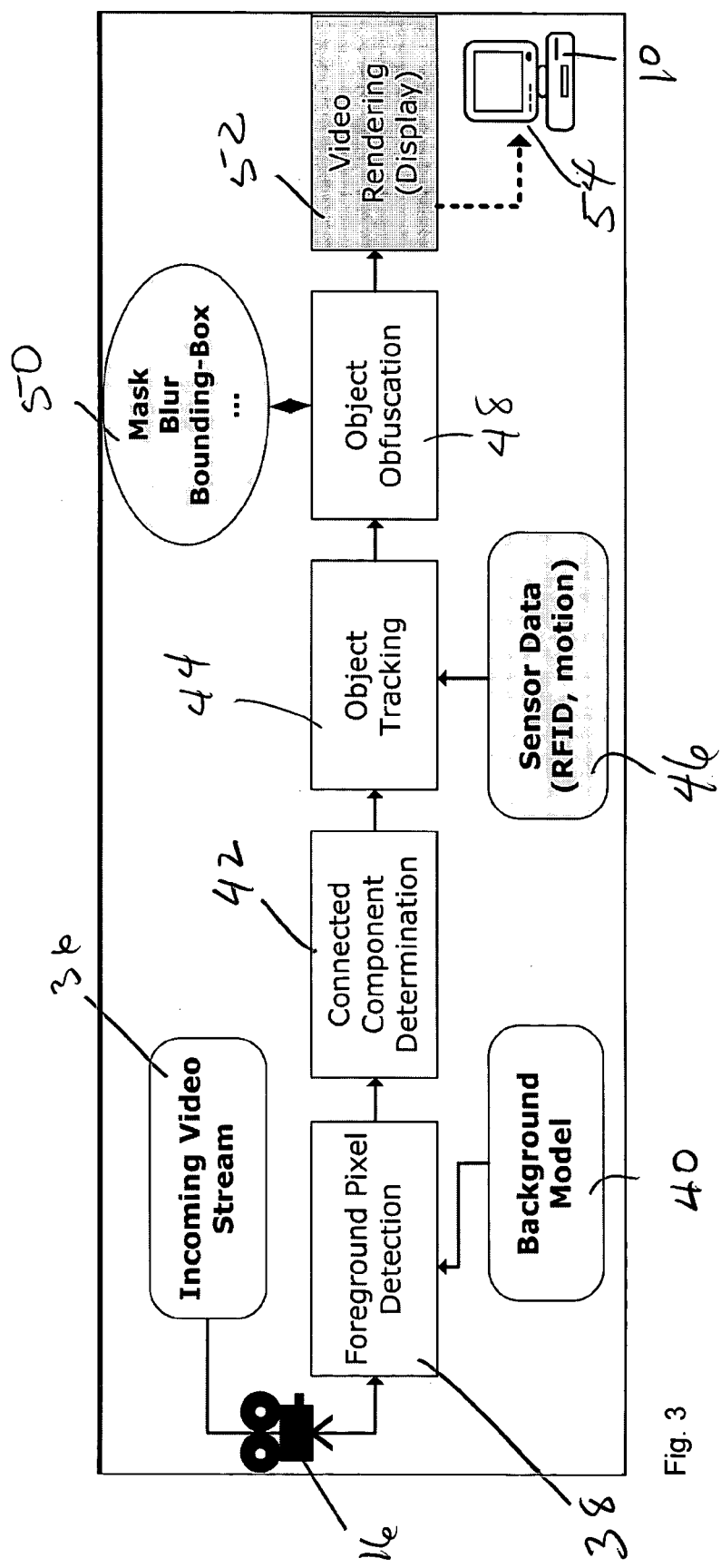
FIG. 3 is a high level flow chart of the video subsystem's method of operation.

When entry into a space 12 is detected, the tag information is read, if a tag 14 is present, and that information is passed to the RFID control module 22a which forwards an authorization request to the policy engine 26. The policy decision for the object is then passed to the video processing module 30, which uses this information in rendering the video object. FIG. 3 is a high level flow chart of the video subsystem's method of operation.

Consider now the video processing subsystem. A flow chart of FIG. 3 identifies the operation of the main components of the current video processing subsystem. The video analysis software of the illustrated embodiment is based on detection of moving foreground objects in a static background. Other kinds of video analysis software can be equivalently substituted without departing from the scope of the invention. The choice of a relatively simple algorithm is made because of the need for real-time processing. An incoming video stream is provided at step 36 from camera 16. Using a background model at step 40, the foreground pixel detection module stored in computer system 10 as part of module 30 passes the result at step 38 to a simple 4-connected component algorithm in module 30 at step 42 to cluster pixels into blobs. The object tracker in computer system 10 in module 30 identifies objects entering the field of view of the camera 16 at step 44 and localizes them in the video frame using information passed to it by the RFID control module 22a at step 46. Depending on access control policy determined by policy engine 26, the video stream is further processed by module 30 using one of a number of masking techniques photographically illustrated in FIG. 4 before being displayed by the rendering module, which is part of module 32. This entire process is tuned to maintain a frame rate of approximately 30 fps. It should also be noted that the video camera capture function is motion triggered. This way, video is only captured when there is activity in the space being monitored making it much easier to focus on events of interest and save computer storage if video data is being archived.

FIGS. 4a-4d photographically illustrate the privacy-protecting masking techniques for video utilized by the illustrated embodiment. FIGS. 4a-4d represent different levels of user privacy. A frame of the original video is shown FIG. 4a, followed by a noise/blur filter in FIG. 4b, a pixel-coloring approach is shown in FIG. 4c, and is followed by a bounding-box based technique in FIG. 4d, which hides details such as gender, race or even dimensions of the person in question.

Turn now to the specification of access control policy where an illustrated method for specifying and enforcing security policies is described in the context of the illustrated architecture. It is to be expressly understood that modifications to both the architecture and the access control policy which it implements can be made within the spirit and scope of the invention. The access control model is important to our system and allows the specification of spatial constraints, i.e. to which spaces a person has access. Our access control policy allows the implementer to specify policies which dictate the manner in which video surveillance is conducted in a physical space 12. In other words, the policy decisions drive the video subsystem. For example, a member of the janitorial staff cleaning an office suite at 2 A.M. might be considered "normal". However, if corporate policy prohibits entry to particular parts of the building after midnight, this event may be considered a potential security breach as calling for a need to be further investigated. The policy decisions which can be made and implemented are arbitrary and can be defined without limitation.

We specify security policies using extensible Access Control Markup Language (XACML), which policies are processed by the enforcement or policy engine 26 which provides mediated access to database 28. XACML is utilized to define the access policies as well as carry out enforcement of these policies. XACML is a standard, general purpose access control policy language defined using XML. It is flexible enough to accommodate most system needs, so it may serve as a single interface to policies for multiple applications and environments. In addition to defining a policy language, XACML also specifies a request and response format for authorization decision requests, semantics for determining policy applicability and so on. The components of the access control model are the video-based objects, the potential users, and modes of access which can be modeled as a traditional authorization rule of the form <s, o, m>, where subject s is authorized to access object o under mode m, where the mode is associated with a particular privacy level. Below we give a general description of the type of policies supported by system 10 and then give specific examples of their specification in XACML. A simple example of subject specification is shown in Table 1 below.

TABLE 1

<!-- Access request by tag 1001 -->
<Subject>
  <Attribute AttributeId="urn:oasis:names:tc:xacml:1.0:
  subject:subjectid"
  DataType="urn:oasis:names:tc:xacml:1.0:data-type:
  rfc822Name">

TABLE 1-continued

<AttributeValue>tag1201</AttributeValue>
  </Attribute>
</Subject>

Any type of policy specification framework can be implemented and applied to our general set of primitives.

Turn now to the access control framework. Here we present a framework for access control specification in the context of system 10. For the purposes of illustration only, we outline a simplified specification of the framework. Assume a set of spaces 12a, 12b, 12c . . . are monitored over time with a set of corresponding video streams, Va, Vb, Vc, . . . associated with these spaces 12a, 12b, 12c . . . respectively. But note that in a general setting more than one video stream can correspond to a space. There is a set of objects O1, O2, O3, . . . , which are being monitored e.g. people or things. These objects can be static, e.g. inventory, or mobile. Each of these objects may have a RFID tag 14 associated with it, which in effect serves as its credential and basis for authorization to a particular space or spaces 12a, 12b, 12c . . . . The mapping between a particular tag 14 and the corresponding object is stored in a profile database 28. We specify a set of tags 14a, 14b, 4c, . . . Tx . . . and use the set as the subject of the authorization rules. Furthermore, each tag 14a, 14b, 14c, . . . 14x . . . also has associated with it a privacy level P0, P1, P2, . . . such as illustrated in FIGS. 4a-4d. These privacy levels P0, P1, P2, . . . specify the sensitivity at which video information pertaining to a particular object should be collected or viewed. The privacy level P0, P1, P2, . . . of a tag 14a, 14b, 14c, . . . is determined at the time the tag 14a, 14b, 14c, . . . is issued and can be modified later by an administrator. In system 10, we use four levels P0, P1, P2, and P3 of increasing sensitivity (P0 corresponds to no privacy and P3 to total privacy) and map a masking technique of FIGS. 4a-4d to each of these levels.

Finally, to aid in specifying group-based authorization rules, we introduce an object association list. This is a useful concept, not in the traditional notion of access groups but for associating inventory, i.e. equipment etc. , with users authorized to use them. We use the more general notion here that members of object association list are simply other objects, however in practice these objects are of a static nature. Therefore we can associate with an arbitrary tag 14x, and therefore an object, with a set of rules which allow or deny an action as well as an element d that defines the default ruling of this rule set. Default rulings can be one of {+, −, 0;}, corresponding to 'allow', 'deny' and 'don't care'. A member of the rule set is a 5-tuple of the form <r, p, oa, ts, res>, where r designates a space 12, p designates a privacy level, oa designates an object in the object association list, ts designates a temporal constraint (e.g. a time range, [tsmin,tsmax] corresponding to the validity of the rule) and res designates a result {+, −} corresponding to 'allow' or 'deny' respectively. A 'deny' result would imply that the object in the corresponding video stream would be unaltered and shown (p=P0), whereas 'allow' would cause the video stream to be altered so as to protect the identity of the object in question, depending on the value of p.

Additionally, authorization rules are subject to a deny-takes-precedence evaluation strategy. That is if a specific 5-tuple <r, p, oa, ts, −> with a deny value in the last element exists, all corresponding tuples <r, p, oa, ts, +> are removed. Some typical examples are given below, following a generic authorization request of the form (tag,space,timestamp), which specifies the tag 14 in question, the space 12 it has entered, as well as the time of the request.

A person entering a space 12 with no tag (0,ri,ts), will not have any rules associated with him or her aside from the default ruling, which will be 'deny'. The first element in the triple (0,ri,ts) is a tag value or identity, the second the space identity and the third the time interval. This corresponds to a privacy level of P0, meaning the person will be shown.

A person entering a space with a valid tag 14 (ti,ri,ts), will satisfy spatial and temporal constraints and return an 'allow' decision together with the corresponding privacy level, p.

Person with an invalid tag 14 has two possible outcomes. Assuming the tag 14 has been successfully authenticated, two possible violations may cause a 'deny' result from an authorization rule. First, the access rights associated with the current tag 14 specify that the requesting space 12 is unauthorized, causing a spatial access violation. Second, the access rights associated with the current tag 14 specify that the time stamp associated with the request does not satisfy the time bounds associated with the requesting space 12. We adopt two possible approaches to handle a violation of this manner. Either the person is immediately unmasked in the current space 12, or remains masked until subsequent re entry into the space 12 causes reevaluation of the associated access rights. Table 2 below shows an example of an authorization rule that enforces a time constraint on a space 12 expressed in XACML.

TABLE 2

```
<!-- Only allow entry into region from 8am to 1pm -->
<Condition FunctionId="urn:oasis:names:tc:xacml:1.0:function:and">
    <Apply FunctionId="urn:oasis:names:tc:xacml:1.0:function:
    time-greater-than-or-equal"
        <Apply FunctionId="urn:oasis:names:tc:xacml:1.0:function:
        time-one-and-only">
            <EnvironmentAttributeSelector DataType="http://www.w3.org/
            2001/XMLSchema#time"
                AttributeId="urn:oasis:names:tc:xacml:1.0:environment:
                current-time"/>
        </Apply>
        <AttributeValue DataType="http://www.w3.org/2001/
        XMLSchema#time">08:00:00</AttributeValue>
    </Apply>
    <Apply FunctionId="urn:oasis:names:tc:xacml:1.0:function:
    time-less-than-or-equal"
        <Apply FunctionId="urn:oasis:names:tc:xacml:1.0:function:
        time-one-and-only">
            <EnvironmentAttributeSelector DataType="http://www.w3.org/2001/
            XMLSchema#time"
                AttributeId="urn:oasis:names:tc:xacml:1.0:environment:current-
                time" />
        </Apply>
        <AttributeValue DataType="http://www.w3.org/2001/
        XML.Schema#time">13:00:00</AttributeValue>
    </Apply>
</Condition>
```

Group-based authorization provides another example. Here we associate a temporal threshold with each tag request, i.e. entry into a monitored space 12. If multiple tag events are detected within this temporal threshold, they are treated as a group authorization request. In which case, the respective object association lists are cross-checked.

Turn now to the privacy protecting video processing techniques. Our video subsystem as diagrammatically depicted in FIG. 3 relies on techniques that detect moving foreground objects from a static background in an indoor setting. When the video camera 16 is turned on, the initialization process learns the background for a scene in approximately 100 frames. Each background pixel is modeled as one Gaussian distribution with two elements [E, $\sigma_i$] defined as follows:

$$E_i = [\mu_{R(i)}, \mu_{G(i)}, \mu_{B(i)}]$$

$$\sigma_i = [\sigma_{R(i)}, \sigma_{G(i)}, \sigma_{B(i)}]$$

where $\mu_{R(i)}$, $\mu_{G(i)}$, $\mu_{B(i)}$ and $\sigma_{R(i)}$, $\sigma_{G(i)}$, $\sigma_{B(i)}$ are the arithmetic means and standard deviations of the ith pixel's red, green and blue channels respectively, computed over N still background frames. The processed mean and standard deviation images are stored in main memory of system 10, after which each incoming frame is grabbed and goes through pixel level analysis to distinguish moving foreground pixels from the background. The selection process is illustrated in Algorithm 1 below. TCD is the color distortion factor computed for each pixel channel as $\mu +/- (3*\sigma)$.

Algorithm 1: The Pixel Selection Process

```
1:  for each (i^th) pixel in the current frame do
2:      for each R,G,B channel do
3:          if one of i^th pixel channel value is NOT within the
            TCD then
4:              select pixel as foreground
5:          end if
6:      end for
7:  end for
```

Once the foreground pixels are identified from the background, we pass it to a conventional simple 4-connected component algorithm as described in Horn, B. K. Robot Vision. McGraw-Hill Higher Education (1986) to cluster pixels into blobs in one pass from bottom left to top right. We use a threshold to discard blobs with few numbers of pixels which are considered to be noise. Empirical analysis was carried out on a number of video clips for a sample setting to determine appropriate threshold values for this purpose as discussed below. For this sample application, the threshold was set to the minimum number of pixels a person's body can occupy in a 320×240 image. Clearly, the invention contemplates other thresholds that are selected for different sample applications.

Figure 6:
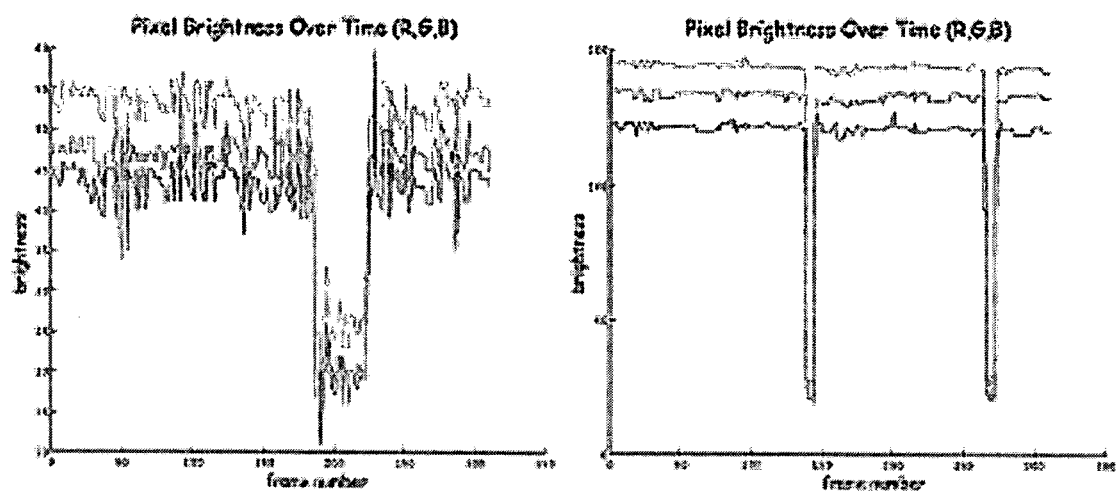
FIGS. 6a and 6b are graphs which show pixel brightness over time for a sampled point in a scene where one person enters as depicted in FIG. 6a and two persons enter in FIG. 6b.

In addition, attributes such as the center of gravity, maximum, minimum x and y range, and the area in pixels are assigned to each blob. FIGS. 6a and 6b are graphs which show pixel brightness over time for a sampled point in a scene where one person enters as depicted in FIG. 6a and two persons enter in FIG. 6b. In FIG. 6a the pixel of interest is against a non-static background. Note the erratic variation in brightness. It can also be seen that the person spends more time at the sampled point. In FIG. 6b it can be seen that the background is less dynamic.

Turn now to object tracking. Our tracker 44 maintains a list of objects present in the scene. Each object (person) has the following parameters which are updated for each frame:
1) Minimum and maximum x and y pixel range to identify a bounding box around each person;
2) The area a person occupies in the frame (in pixels) to determine if the object is legitimate or simply noise;
3) The person's center of gravity (COG);
4) A velocity vector for a person;
5) The future COG, which is computed as follows (where V is the velocity vector, and disTime is the displacement time for the object) futurecogx=cogx+(Vx*disTime) futurecogy=cogy+(Vy*disTime)
6) The current frame number. This is used to identify whether a person in the list is present in the scene, and accordingly whether they will be retained or removed from the object list;
7) A merge list to indicate whether a person has merged with other persons. Two people in the scene are determined to have merged if they point to the same blob in the current frame. Splitting occurs when the same two merged people in the previous frame point to two different blobs in the current frame, upon which the merge list is updated.

After each frame gets processed into legitimate blobs, the tracker 44 tries to match each person in the list with a candidate blob in the incoming frame using conventional motion vector prediction as described in Lipton, A., Fujiyoshi, H., and Patil, R. Moving Target Classification and Tracking From Real-time Video. In IEEE Image Understanding Workshop (1998), pp. 129-136. In essence if a person's COG falls within one of the candidate blobs' bounding box in the current frame, then the information is assigned to that particular blob (COG, min/max parameters, area etc.). If a match is not found between an object and all the blobs in the current frame, the object is removed from the list and assumed to have exited the scene. If a new blob does not have a match in the object list, a new object is created and assigned authorization information (masking level) by the RFID subsystem 20. An outline of the algorithm is shown in Algorithm 2 below.

---
Algorithm 2: The Tracking Algorithm
---

```
 1: peopleList = ∅
 2: for each incoming frame, f do
 3:    for each candidate blob, b in f do
 4:       for each person, p ∈ peopleList do
 5:          findMatch(p,b)
 6:       end for
 7:       if match is not found for b then
 8:          create a person object p corresponding to b
 9:          privacyLevel := fuseRFID(p)
10:          p.maskingLevel := privacyLevel
11:          peopleList.add(p)
12:       end if
13:       p.frameNumber := f
14:    end for
15:    for person, p ∈ peopleList do
16:       if p.frameNumber != f then
17:          peopleList.remove(p)
18:       end if
19:    end for
20:    for persons, p and q ∈ peopleList do
21:       if p and q point to the same blob then
22:          add p to q.mergeList
23:       else if p ∈ q.mergeList then
24:          remove p from q.mergeList
25:       end if
26:    end for
27: end for
```

During the rendering process, the blob's corresponding masking level is applied to the outgoing video stream. In the case of a merge, the highest masking level among the persons involved in the merge is applied to the corresponding blob. For example if a person with privacy level P1 merges with a person with privacy level P2, then the merged blob is masked using P2.

Figure 7:
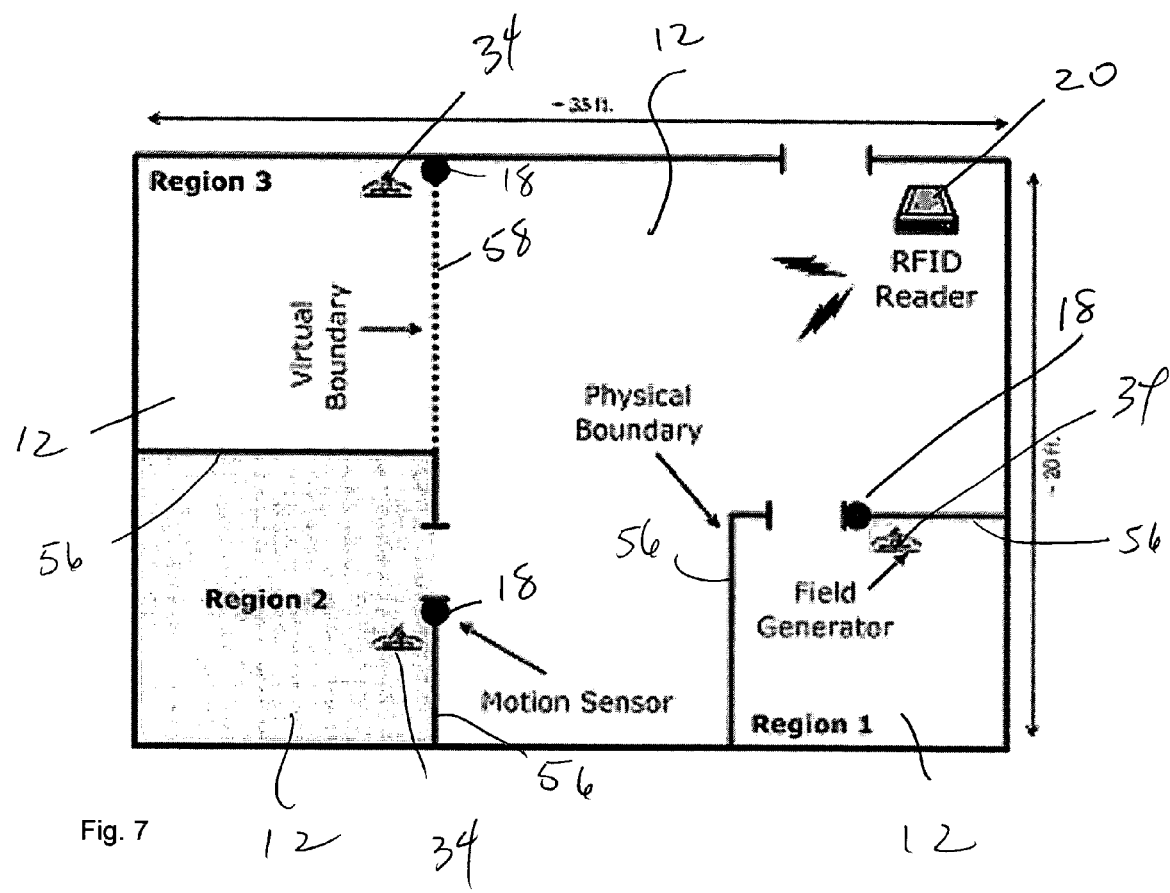
FIG. 7 is a floor plan of another embodiment in which an experimental test of the invention was performed.

Consider now an illustrated implementation of the invention and the results obtained. FIG. 7 is a diagram of a floor plan which includes multiple spaces 12 encompassed within an envelope of approximately 35 by 20 feet in which an experiment was run using RFID equipment. For the experiments described in this embodiment we used Canon Optura 20 DV cameras 16, capturing video at a resolution of 320× 240. One RFID reader 20, tags 14, and field generator relays 34 were used for the instrumented spaces 12. All processing in system 10 was carried out on a uniprocessor Pentium 4 at 2.60 Ghz with 1 GB of RAM equipped with a Pinnacle firewire video capture card under Windows XP Professional. Microsoft's DirectX SDK (8.0) was utilized for interacting with the camera 16. The RFID reader 20 was connected to the computer of system 10 via a four-wire RS-232 interface, and we used medium range RFID tags 14 that transmit and receive at 916.5 Mhz and 433 Mhz respectively. The TrakTags 14 utilized in the experiments have a range of approximately 275 ft (85 m) and the field generators 34 possess a wake-up range of between 6.5-108 ft (2-33 m).

The range of the field generator relays 34 are hardware adjustable, and were calibrated to detect activity in the spaces 12 of interest. We outfitted an office workspace by creating two spaces with physical boundaries 56 (rooms) and one open area which was partitioned by one of the relays 34 via a virtual boundary 58. Motion sensors 18 were used to monitor activity in and out of the chosen spaces. As the motion detector sensor 18 detects movement, it wakes up the field generator 34 which transmits a constant 433 MHz field to detect any tags 14 in the space 12. This information is sent to the reader 20. Field generators 34 and motion sensors 18 were positioned at the entry points to the spaces 12 being studied. Each space 12 was monitored by a single camera 16 for the purpose of these experiments.

The RFID event handling process involves detection of a tag 14 in a space 12, checking the associated access control policy and relaying the result to the video subsystem 52. On detection of a tag 14, a tag ID, a reporting field generator ID (effectively the zone identification) and a timestamp is obtained. A separate thread in the video process waits for this information on a socket and depending on the policy decision, renders the object (which may be masked). Table 3 below depicts the high-level RFID event handling procedure for (non-group) events.

TABLE 3

```
long TagEvent(long status, HANDLE funcId,
              rfTagEvent_t* tagEvent, void* userArg)
{
    if (tagEvent->eventType == RF_TAG_DETECTED) {
        if (PolicyCheck(GenerateXACMLRequest
        (tagEvent->tag->id,tagEvent->fGenerator,enterTime)))
            signalVideoThread(videoSocket, szBuf);
    }
}
```

Figure 8:
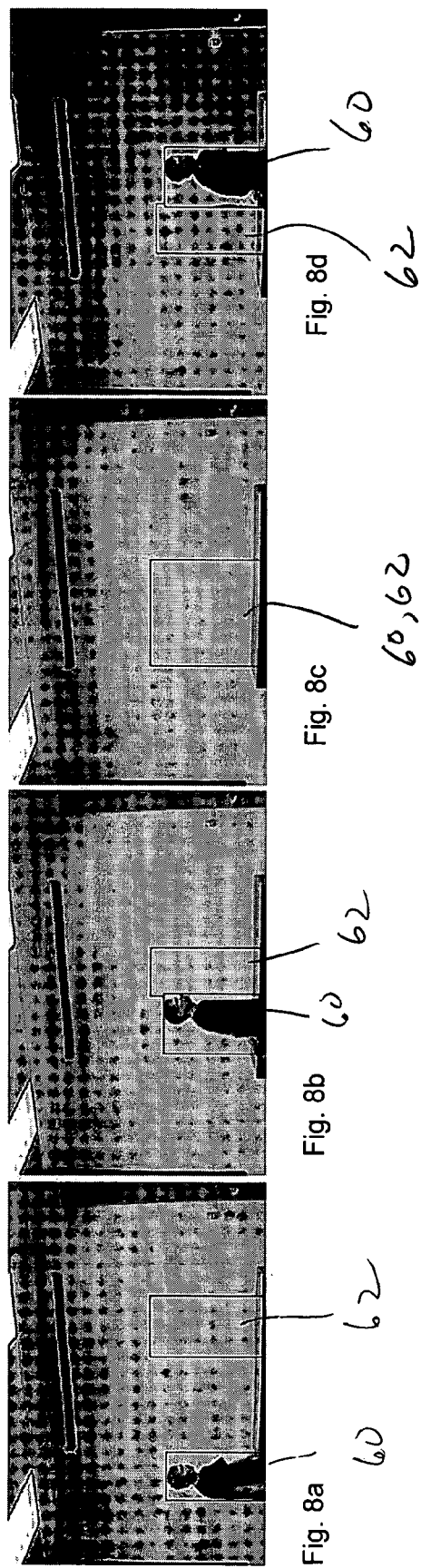
FIGS. 8a-8d are a series of photographs illustrating the merge and splitting performance of a masked and unmasked person in a room as visually displayed by the invention.

In this experiment we demonstrated the functionality of our framework by testing a variety of cases. In the context of each of the scenarios outlined above, we also tested the functionality of our tracking and masking algorithms. Interaction between multiple people with varying access rights were tested, especially merging and splitting between masked and unmasked objects. FIGS. 8a-8d are photographs which illustrate the interaction between authorized and unauthorized people in video. Here we can see the merging/splitting process as two persons, one 60 unauthorized and visible and another 62 authorized and masked, pass each other in view of the camera 16. In FIG. 8a the unauthorized person 60 is shown to the left in the frame and the authorized person 62 is indicated by the empty outlined rectangle to the right in the frame. In FIG. 8b they move to a situation where they are adjacent to each, in FIG. 8c are superimposed on each other so that neither is shown, and in FIG. 8d they are still adjacent but have switched positions from left to right.

In evaluating the performance of this illustrated embodiment, we investigated the overheads involved in our techniques. We observed that for a single camera 16 the overhead of the various masking techniques as shown in FIGS. 4a-4d were negligible due to the limited field of view of the camera 16 and hence the number of people interacting simultaneously at any given time. We chose a resolution of 320×240 as it strikes a good balance between detail and performance both in terms of frame rate and storage space if the video was being archived. Doubling the resolution to 640×480 affected the frame rate significantly as expected in the illustrated embodiment, as on average just under 20 fps was achieved. At our target resolution of 320×240, we achieved a constant frame rate of 30 fps in all tested cases.

Figure 9:
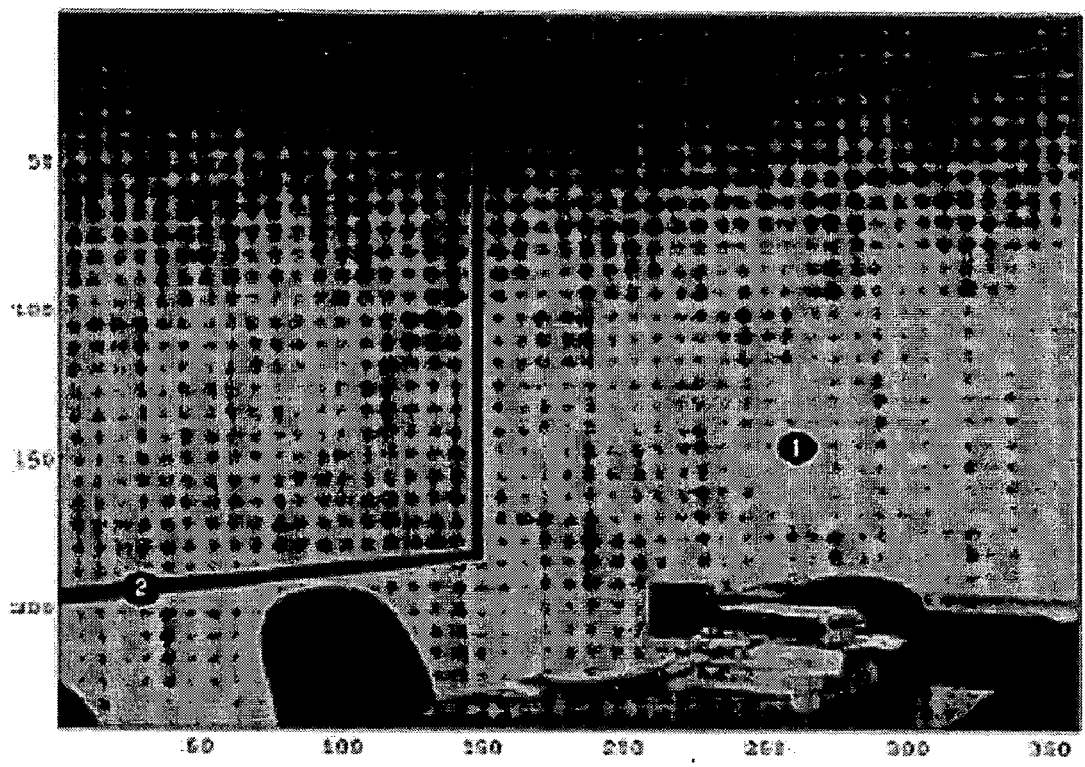
FIG. 9 is an office scene used for scene analysis by the invention.
Figures 10A, 10B:
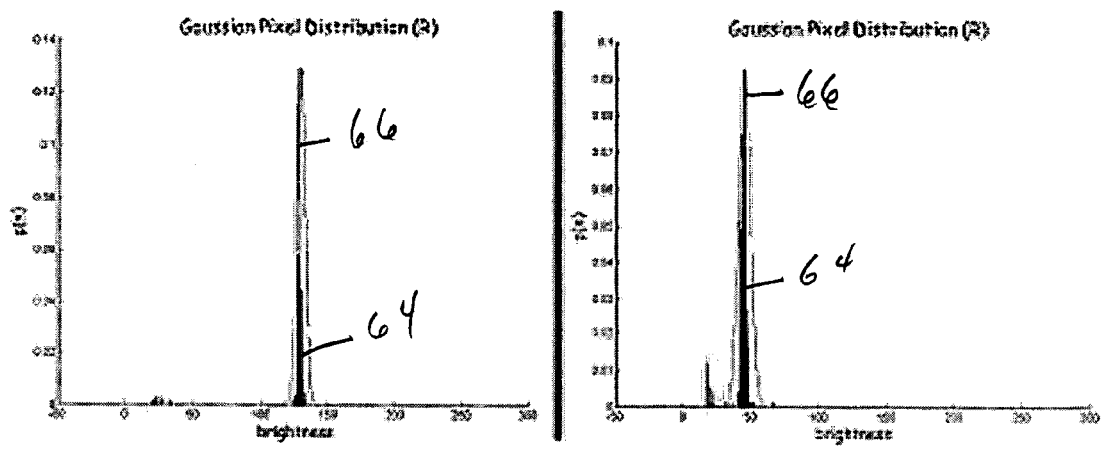
FIGS. 10a and 10b are graphs of the Gaussian pixel distribution for point 1 and point 2 in FIG. 9 respectively showing the pixel density verses brightness. A person enters the scene and moves from point 1 to 2. The pixel distribution for the two points in the video stream are shown.

FIG. 9 is an embodiment where a typical office scene is used for analysis. Video analysis was performed on the scene of FIG. 9 prior to implementing our video subsystem. The scenario consisted of one person entering the scene from the right of the frame and moving through the room to point 2 as shown to the left of the frame. As outlined above, we utilize a pixel selection process to distinguish moving foreground pixels from the background, and model each background pixel as a Gaussian distribution. FIGS. 10a and 10b are graphs which show this distribution for the two points 1 and 2 in FIG. 9 respectively. In each case, the pixels corresponding to the person entering the room is shown by the darkened lines 64. The other set of pixels 66 (the dominant peak) represents the background pixels. It can be seen for point 2 in FIG. 10b, the foreground pixels 66 (i.e. the clothing worn by the person in the scene) are very close to the sample point (window sill). Hence, the threshold used (in this case 3*σ) becomes very important in distinguishing the two. It is entirely within the scope of the invention that more advanced techniques can be introduced to make the pixel detection process more robust.

Even though we have realized a fully-functional implementation of our framework, the deployment of such a system 10 should eventually be pushed to the camera level. In our implementation, we tightly coupled the processing capabilities of the personal computer to the camera 16 and processed everything in real-time with no archival of the original video data (only the processed video stream is available). Ideally this processing capability should reside at the camera level to make the privacy preservation in media spaces 12 more acceptable to the end-users. Optimization of the algorithms used here for object tracking and masking for privacy is a central component of such a realization as well as the possible use of MPEG-4 video. MPEG-4 has superior compression efficiency, advanced error control, object based functionality and fine grain scalability making it highly suitable for streaming video applications. Recently MPEG-4 has emerged as a potential front runner for surveillance applications because of its layered representation, which is a natural fit for surveillance tasks as they are inherently object-based. It is also desirable to find people moving in the scene, independent of the background.

We utilize a form of background subtraction in the video subsystem of the invention, but it is not central to the operation of the invention. Issues dealing with illumination changes, shadows, dynamic backgrounds are also not described here, but it is to be understood that it is intended that these techniques be added to make video subsystem more robust. Relevant technologies in real-time motion tracking, image/face recognition and video data indexing have been studied but rarely infused with techniques to preserve privacy. These techniques too are intended to be included in the illustrated embodiment of the invention. We provide surveillance only when activity is taking place within a space 12. Our framework utilizes different modalities of sensor data by providing information that assist the video subsystem in detecting and classifying anomalies. In our approach, we apply the processing techniques on a per-object basis and apply this effect in real-time as the object is tracked in the space. We utilize these techniques, and adopt a XACML type architecture to specify and enforce access control in our system. XACML is an attractive option that presents standardized interfaces for request/response formats and can describe an access control policy across many applications. Additionally, a single XACML policy can be applied to many resources. This helps avoid inconsistencies and eliminates duplication of effort in creating policies for different resources.

In summary, the illustrated embodiment thus provides a framework for privacy-protecting data collection in video spaces 12. What is disclosed is a fully functional system able to achieve real-time results at an acceptable frame rate while achieving defined goals for privacy protection of users. It is to be understood that not only motion sensors 18 can be used, but additional types of sensor data (e.g. acoustic sensors) as well. The policy framework disclosed above can be expanded to capture more complex policies that deal with additional attributes and information from other types of sensors. Further optimization of the video processing techniques used in our framework are expressly contemplated as being with the scope of the invention.

A number of additional considerations which have not been discussed in detail above are nonetheless included with the spirit and scope of the invention. In the illustrated embodiment, our experimental setting was an indoor space. This problem becomes much more complex in an open, outdoor environment where it is very difficult to define the background as it can change very frequently. The illustrated embodiment is intended to include outdoor environments.

Additionally, the number of objects in view may be significantly greater so scalability becomes a concern. The notion of fusing together multiple cameras in gathering information about a space is also of interest in such a setting. More specific enhancements to the system can be made at the pixel level by using a mixture of Gaussian distributions to deal with lighting changes, long term scene change and ambient motion. For example, dealing with static objects in scenes where they becomes part of the background and other moving objects like window shutters etc. Combining motion prediction with histogram-based template matching of a person's blob-color can improve accuracy significantly in tracking people, especially when they merge and split. Each of these concerns and technical issues are contemplated as being within the spirit and scope of the invention.

While the security and privacy concerns associated with RFID hardware itself is a concern, as RFID technology evolves and tags have the ability to perform some level of computation, authentication schemes utilizing low-cost cryptographic techniques can be utilized as part of the illustrated embodiment.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A security system which is nonintrusive of personal privacy of a person in a space comprising:
   a first localization sensor subsystem, if any, corresponding to the person;
   a video surveillance subsystem arranged and configured to collect visual data related to the person in the space;
   a computer subsystem coupled to the first localization sensor subsystem and the video surveillance subsystem to associate a predetermined one of a plurality of privacy levels with the first localization sensor subsystem, and to provide an access control privilege with the first localization sensor subsystem, the computer subsystem determining when and where to obfuscate the visual data if the predetermined privacy level associated with the person is within spatial and temporal bounds of the space; and
   a second localization sensor subsystem corresponding to an object and where the computer subsystem determines how to obfuscate the visual data according to association within a space of a identified person with the object.

2. The security system of claim 1 where the computer subsystem monitors the person only when unauthorized access is made to the space.

3. The security system of claim 1 where the first localization sensor subsystem comprises an RFID tag and RFID tag reader.

4. The security system of claim 1 where the first localization sensor subsystem comprises a motion detector.

5. The security system of claim 1 where the first localization sensor subsystem comprises an acoustic detector.

6. The security system of claim 1 where the computer subsystem masks the visual data of two or more identified persons in the same space according to the different respective values of the privacy level corresponding to each of the two or more identified persons.

7. The security system of claim 6 where the computer subsystem masks the visual data of two or more identified persons in the same space by selectively providing a degree of information loss from the visual data according to the respective privacy level of each of the two or more identified persons.

8. The security system of claim 6 where the computer subsystem determines how to obfuscate the visual data of two or more identified persons in dose proximity according to the highest associated predetermined privacy level of the two or more identified persons.

9. The security system of claim 1 where the computer subsystem comprises a sensing module which receives information from the localization sensor subsystem.

10. The security system of claim 1 where the computer subsystem comprises a sensing module which receives video data from the video surveillance subsystem.

11. The security system of claim 1 where the computer subsystem comprises a data management module communicated with the sensing module to provide access control.

12. The security system of claim 11 where the data management module comprises a policy engine to generate access control decisions and a database subsystem communicated to the policy engine to provide parameters form which the policy engine generates access control decisions.

13. The security system of claim 12 where the policy engine comprises a policy decision point submodule and a policy enforcement point submodule communicated with each other through a request/response protocol, the policy decision point submodule receiving authorization requests from the localization sensor subsystem and generating authorization decisions to the video surveillance subsystem, the database subsystem comprising a profile access database and a policy database, the policy enforcement point submodule communicated to the profile access database to read attributes therefrom and communicated to the policy database to read policy rules therefrom.

14. The security system of claim 13 where the request/response protocol through which the policy decision point submodule and policy enforcement point submodule communicate is XACML.

15. The security system of claim 1 where the computer subsystem comprises an auxiliary services module communicated with the data management module for obfuscating incoming video data.

16. The security system of claim 15 where the auxiliary services module comprises obfuscation, motion detection and object tracking submodules.

17. The security system of claim 1 where the computer subsystem comprises an output module communicated with the auxiliary services module for customized reporting, logging or video rendering.

18. The security system of claim 3 further comprising a field generator for receiving signals from the RFID tag and relaying the received signals to the RFID reader.

19. The security system of claim 18 where the localization sensor subsystem comprises a motion detector coupled with and triggered by the field generator to read a corresponding space for an RFID tag when motion is detected by the motion detector, and if unauthorized entry into the space is determined by the computer subsystem, the video surveillance subsystem is activated to generate a processed video record according to a predetermined privacy level associated with the read RFID tag, if any.

20. The security system of claim 1 where video surveillance subsystem comprises a camera for providing a video pixel stream, a foreground module communicated to the camera for providing foreground pixel detection of the space, a background module for providing a background model communicated to the foreground module, a blob module communicated to the foreground module for clustering pixels into connected image domains, an object tracking module communicated to the blob module for localizing the person in a video frame correlated to localization parameters associated with the person moving in the space, a image processing module communicated to the object tracking module for modifying video data correlated to the object according to the selectively determined privacy level, and a video rendering module communicated to the image processing module for rendering a display of the modified video data correlated to the person.

21. The security system of claim 1 where the camera is triggered by motion detection of the object in the space as generated by the localization sensor subsystem.

22. The security system of claim 20 where the image processing module comprises a pass through channel, a noise/blur filter, a pixel-coloring filter, and a bounding-box imager, one of which is activated according to the privacy level.

23. The security system of claim 12 where policy engine processes a rule set comprised of a plurality 5-tuples of the form <r, p, oa, ts, res >, where r designates a space, p designates a privacy level, oa designates an object in an object association list, ts designates a temporal constraint corresponding to the validity of the rule, and res designates a result corresponding to 'allow' or 'deny' respectively, wherein the result corresponding to 'allow' causes the visual data to be obfuscated so as to protect the identity of the object in question, and wherein the result corresponding to 'deny' allows the visual data to go unaltered and shown.

\* \* \* \* \*

UNITED STATES PATENT AND TRADEMARK OFFICE
CERTIFICATE OF CORRECTION

PATENT NO. : 7,940,302 B2  
APPLICATION NO. : 11/227721  
DATED : May 10, 2011  
INVENTOR(S) : Mehrotra et al.

Page 1 of 1

It is certified that error appears in the above-identified patent and that said Letters Patent is hereby corrected as shown below:

Column 18, line 24, in Claim 8, delete "in dose" and insert -- in close --.

Column 18, line 39, in Claim 12, delete "form" and insert -- from --.

Column 20, line 14, in Claim 23, delete "res >," and insert -- res>, --.

Signed and Sealed this
Sixteenth Day of August, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,940,302 B2 | Page 1 of 1 |
| APPLICATION NO. | : 11/227721 | |
| DATED | : May 10, 2011 | |
| INVENTOR(S) | : Sharad Mehrotra et al. | |

It is certified that error appears in the above-identified patent and that said Letters Patent is hereby corrected as shown below:

On column 1, line 11, please insert the following paragraph:

--Statement of Government Support

This invention was made with government support under grants 0331690 and 0331707 awarded by the National Science Foundation. The government has certain rights in this invention.--

Signed and Sealed this
Twenty-eighth Day of February, 2012

David J. Kappos
*Director of the United States Patent and Trademark Office*